Patented July 2, 1946

2,403,124

UNITED STATES PATENT OFFICE 2,403,124

ALKYLATION OF BENZENE

Edward N. Rosenquist, Oakwood, and Roy W. Sudhoff, Van Buren Township, Montgomery County, Ohio, assignors to Monsanto Chemical Company, a corporation of Delaware No Drawing. Application March 6, 1942, Serial No. 433,584

8 Claims. (Cl. 260—671)

The present invention relates to the production of alkylated aromatic hydrocarbons and particularly to the production of mono-alkyl benzenes from olefins, polyalkylated benzenes and benzene in the presence of anhydrous metal halide catalyst and hydrogen chloride.

Alkylated benzenes are generally prepared on a commercial scale by the reaction of olefins or alkyl halides with benzene in the presence of anhydrous aluminum chloride. The use of olefins rather than alkyl halides for the reaction is of especial interest on account of the ready availability of olefins from petroleum products, and much work has been done on attempts to obtain maximum yields of alkylated products by this reaction. As long ago as 1879, Balsohn (Bull soc. chim. (2), 31, 539 (1879)) found that when a mixture of ethylene and hydrogen chloride was reacted with benzene in presence of anhydrous aluminum chloride, reaction proceeded with formation of various ethylated benzenes, presumably with intermediate formation of ethyl chloride. He also found that the preparation of ethylated benzenes could be effected without adding hydrogen chloride to the reaction mixture, traces of moisture in the benzene or olefin apparently reacting with the anhydrous aluminum chloride by hydrolysis to liberate enough hydrogen chloride to initiate the reaction, and the hydrogen chloride evolved in the reaction of the primarily formed ethyl chloride with benzene being sufficient for the formation of more ethyl chloride. He found, however, that whereas a mixture of hydrogen chloride and olefin reacted rapidly with benzene, the reaction in the absence of hydrogen chloride was slower and that of the total ethylene thus charged, only 55% of it was absorbed in the preparation of ethylated benzenes. Moreover, he obtained a mixture of alkylated benzenes in which the proportion of polyethylated benzenes exceeded the mono-ethylbenzene.

The production of mono-alkylated benzenes by reaction of gaseous olefins with benzene in presence of a Friedel-Crafts type catalyst is complicated by two factors: (1) Gaseous olefins are not readily absorbed by benzene, so that it is difficult to bring about an intimate contact of the two reactants. (2) In Friedel-Crafts alkylations the rate of alkylation of an alkylbenzene is more rapid than the alkylation of benzene, so that the process results in a mixture of alkylated benzenes having varying degrees of substitution. Factor (1) can be overcome to some extent by pre-mixing the olefin with hydrogen chloride in an approximately 1:1 ratio. In this case reaction proceeds substantially as it does with an alkyl halide, but here the use of large quantities of hydrogen chloride is a considerable factor in commercial operating costs. Attempts to deal with factor (2) have not heretofore been successful.

The problem of preparing alkylated benzenes in good yield from olefins and benzene without adding hydrogen chloride has been studied by Milligan and Reid (J. American Chemical Soc., 44, 206 (1922)) who found that high speed stirring at the rate of 10,000 to 12,000 R. P. M. was of material aid in promoting the absorption of ethylene by benzene in presence of anhydrous aluminum chloride and that in various runs they obtained alkylation products in which the polyethylbenzene content ranged from 32% to 41% of the ethylated material. They found that about 46% of the polyethylbenzenes thus obtained could be converted into monoethylbenzene by heating the polyethylbenzenes with additional benzene in presence of an aluminum chloride-alkyl benzene complex. However, such a conversion required an additional operating step and entailed an accumulation of a polyethylbenzene stock because the conversion of polyethylbenzene to mono-ethylbenzene was not complete; only by dint of a long series of such conversions could be envisioned the substantially entire transformation of polyethylbenzenes into mono-ethylbenzenes. Subsequently Berry and Reid (J. American Chemical Soc., 49, 3142 (1927)) reduced the rate of stirring to approximately 8,000 R. P. M. in the reaction of benzene with ethylene in presence of anhydrous aluminum chloride and obtained alkylated benzenes in which the polyethylbenzene content ranged from 46% to 53%. The effect of high speed stirring on ethylene absorption in the reaction was carefully studied by Huber and Reid (Ind. Eng. Chem., 18, 537 (1926)) and they found that whereas with stirring at 3,000 R. P. M. they obtained an ethylene absorption of only 80 cc. per mol benzene per minute, the absorption increased to 150 cc. at 8,000 R. P. M. and to 200 cc. at 12,000 R. P. M. Using high speed stirring (11,000 R. P. M.), Cline and Reid (J. American Chemical Society, 49, 3150 (1927)) obtained an increased mono-ethylbenzene to polyethylbenzene ratio in the alkylation product by reacting a mixture of benzene, ethylene, polyethylbenzenes, anhydrous aluminum chloride, and a lower layer from a previous benzene-ethylene-aluminum chloride reaction, thus eliminating an additional operating step in the conversion of polyethylbenzenes to monoethylbenzene; however, they obtained more polyethylbenzenes than they had started with, the input of polyethylbenzenes being 100 g. and the output, 144 g. Since their process resulted in the production of more polyethylbenzenes than was used for a new alkylation cycle, it, too, was accompanied by an inevitable accumulation of by-product polyethylbenzene.

Later, Natelson (Industrial and Engineering Chemistry, 25, 1391 (1933)) attempted to increase ethylbenzene to polyethylbenzene ratio in the products resulting from the reaction of ethylene with benzene in presence of anhydrous aluminum chloride by premixing the benzene with hydrogen chloride, but he found that it took 12 hours to absorb 200 g. of ethylene in 1000 g. of benzene and that his alkylated product had a 40% content of polyethylbenzenes. Only with rapid stirring and under an added pressure of 600 mm. of mercury was he able to increase the absorption rate and to reduce the polyethylbenzene content of his alkylated product to about 25%.

Although reactions under pressure, in which evolved hydrogen chloride is prevented from escaping, result in increased ethylene absorption and lowered polyethylbenzene to mono-ethylbenzene ratios when merely the initial feed is pre-mixed with hydrogen chloride, in our investigations we have found that at ordinary atmospheric pressures approximately 100% absorption of the ethylene can be effected only if we use 1 part of hydrogen chloride to 6–10 parts of ethylene throughout the reaction of ethylene with benzene in the presence of anhydrous aluminum chloride. These facts explain the poor results obtained in the prior processes as regards ethylene absorption and high polyethylbenzene content of the product when only the initial feed of ethylene was pre-mixed with hydrogen chloride in processes carried out under ordinary atmospheric pressure. Moreover, we have found that when we use a mixture of gaseous hydrocarbons, for example, a mixture comprising approximately 50% ethylene, and 50% gaseous paraffins, as the ethylenic constituent in the alkylation at ordinary atmospheric pressure, it is necessary to use an approximately 1:2 weight ratio of hydrogen chloride to ethylene in order to obtain approximately 100% absorption of the ethylene. Hence, the commercial production of mono-ethylbenzene by reaction of benzene with ethylene or with ethylene-gaseous paraffin mixtures in the presence of anhydrous aluminum chloride under ordinary atmospheric pressure may be regarded as impractical from the standpoint of the large amounts of anhydrous hydrogen chloride which are required to assure total utilization of the ethylene.

As far as we can determine, therefore, no one has heretofore succeeded in devising a satisfactory, economical process for the production of ethylbenzene from benzene and ethylene or ethylene-gaseous paraffin mixtures. Accordingly, the present invention provides a process by which substantially 100% absorption of ethylene may be realized and which results in the production of polyethylbenzenes only in amounts which are equal to or less than those which can be consumed in said process, and which employs hydrogen chloride in quantities which do not unduly contribute to the cost of the process.

According to the present invention, as applied to the production of ethylbenzene, we react benzene containing from 10% to 30% by weight of polyethylbenzenes (such as have been previously produced in the process) with ethylene or an ethylene-gaseous paraffin mixture in the presence of catalytic amounts of anhydrous aluminum chloride and a constant concentration of hydrogen chloride amounting to from 0.12% to 0.40% by weight of the aromatic hydrocarbon content of the reaction mixture, said hydrogen chloride concentration being maintained by continuous addition of the hydrogen chloride in amounts which may range up to 20% of the introduced ethylene. We have found that the constant maintenance of a hydrogen chloride concentration of from 0.12% to 0.40% and preferably from 0.15% to 0.30% in the reaction mixture (excluding the catalyst complex) is of extreme importance in obtaining total absorption of ethylene as well as in aiding or controlling migration of ethyl groups to the benzene or ethylbenzene from the introduced polyethylbenzenes or the polyethylbenzenes formed during the alkylation. It had been previously assumed that the mere introduction of hydrogen chloride with the initial feed or the formation of hydrogen chloride from anhydrous aluminum chloride and moisture present in the reactants was sufficient to initiate the reaction, and that the hydrogen chloride evolved during the reaction was sufficient to ensure continued condensation. We have found, however, that under ordinary experimental or plant conditions involving the passage of a gaseous olefin into the reaction mixture, the hydrogen chloride liberated during the condensation does not accumulate in the reaction mixture in amounts which we have found necessary to be present in the reaction mixture for assuring the continued total absorption of ethylene. We have found also that the reaction involving the transformation of a mixture of benzene and polyethylbenzene into mono-ethylbenzene is materially aided by the concentration of hydrogen chloride as given above, for the amount of polyethylbenzenes obtained according to our process is equal to or less than that present in the initial benzene-polyethylbenzene mixture. Our process, therefore, makes possible the production of mono-ethylbenzene in such a manner that it entails no waste of ethylene, no extravagant amounts of hydrogen chloride, and no accumulation of polyethylbenzenes. Our process may be operated continuously or batch-wise. In either case the amount of polyethylbenzenes obtained is equal to or less than that used in the feed, so that it permits the production of mono-ethylbenzene without a simultaneous accumulation of stocks of polyethylbenzenes.

We maintained the optimum concentration of hydrogen chloride in the reaction mixture containing polyethylbenzene by addition of anhydrous hydrogen chloride gas directly into the reaction vessel, or with the ethylene or the ethylene-gaseous paraffin mixture, or preferably with the benzene-polyethylbenzene feed. In operating with ethylene gas containing inerts such as the gaseous paraffins, we preferably add the hydrogen chloride by dissolving it in the benzene-polyethylbenzene feed, since we have found that a more thorough intermingling of the hydrogen chloride (caused by a greater solubility therein) with the reaction constituents is thereby obtained; whereas in either the direct introduction of the hydrogen chloride to the reaction vessel or in the introduction of a gaseous hydrogen chloride-ethylene-paraffin mixture to the reaction vessel, a considerable portion of the hydrogen chloride gas may be blown out of the reaction vessel with the paraffinic off-gases before it has come into intimate contact with all the reactants. By first dissolving hydrogen chloride in the benzene-polyethylbenzene mixture at room temperatures, we obtain as much as 1% to 2.0% dissolved therein. When such a solution is passed into the Friedel-Crafts reaction mixture, a liberation of hydrogen chloride gas from the solution occurs because of the lower solubility of HCl in the warmer Friedel-Crafts reaction mixture. The liberated HCl is partly present in the reacting mass in the form of minute bubbles.

The following examples illustrate but do not limit the invention:

Example 1

We charge a reaction vessel, equipped with a commercially available 800–1,100 R. P. M. stirrer, with 70 pounds of benzene, add 5 pounds of anhydrous aluminum chloride, and then over a period of, say, 3 hours introduce 15 pounds of substantially 100% ethylene and from 1.5 pounds to 2.5 pounds of hydrogen chloride. We may introduce the ethylene and the hydrogen chloride either through the same or through separate lines. Then in a continuous manner we add 5 pounds of substantially 100% ethylene per hour, 0.5 pound to 0.83 pound of anhydrous hydrogen chloride gas per hour, and a mixture of benzene and polyethylbenzenes (distilled from a previous alkylation and having a boiling range of from 180° C. to 330° C., Engler) in such a ratio that there are delivered to the reaction vessel 37 pounds of benzene per hour and 7.5 pounds of polyethylbenzenes per hour. The temperature of the reaction mixture is maintained usually within the range of 55° C. to 65° C. Catalyst activity is maintained by adding to the reaction mixture or to the catalyst complex approximately 1 pound of anhydrous aluminum chloride per hour, and removing the spent catalyst complex continuously. We remove either continuously or at, say, 1 hour intervals the alkylation product and find upon analysis that the ethylene absorption has been essentially complete and that the ratio of ethylbenzene to polyethylbenzenes obtained is such that the amount of polyethylbenzenes is equal to or less than charged. The total product contains approximately 45% of unreacted benzene, 40% of ethylbenzene, 15% of polyethylbenzenes and from 0.15% to 0.30% of hydrogen chloride, whereas the benzene-polyethylbenzene feed which we use has a polyethylbenzene concentration of approximately 16% by weight.

Example 2

We use the procedure of Example 1, except that instead of using substantially 100% ethylene, we use a gas containing only approximately 50% of ethylene by volume (comparable to that obtainable in cracking operations and containing substantially no other olefinic constituents) and increase the input of hydrogen chloride to 2.75 pounds per hour during the operation. This procedure results in substantially complete ethylene absorption and a production of alkylated products in which the amount of polyethylbenzenes obtained is less than the amount charged. Accordingly there is no accumulation of polyethylbenzene. However, when operating in this manner, it is necessary to use an excessive amount of hydrogen chloride.

Example 3

We operate as in Example 1, except that instead of using substantially 100% ethylene, we use the diluted ethylene of Example 2 and, in the continuous operation, instead of introducing hydrogen chloride directly into the reaction vessel or with the ethylenic gas, we add the hydrogen chloride in the dissolved state with the benzene-polyethylbenzenes feed, preferably through a line which delivers the feed in close proximity to the ethylene entrance, i. e., in the reaction zone near the stirrer. We find that the addition of the hydrogen chloride with the benzene-polyethylbenzenes feed in the continuous operation in which the liquid benzene-polyethylbenzene feed contains from 1.1% to 1.86% by weight or approximately from 1% to about 2.0% by weight dissolved HCl allows us to use amounts of hydrogen chloride as low and even lower than those used in Example 1 in spite of the fact that here we use a diluted ethylene instead of the substantially pure ethylene of Example 1. Advantageously the benzene-polyethylbenzene solution may be saturated with hydrogen chloride. Moreover we obtain the substantially complete ethylene absorption and low mono-ethylbenzene to polyethylbenzene ratio of Example 1.

Although the examples given above describe application of our process to the production of mono-ethylbenzene, our process is of general applicability to Friedel-Crafts reactions involving the reaction of benzene with gaseous olefins in which there is desired the formation of preponderant amounts of mono-alkylated products and total utilization of the polyalkylbenzenes obtained for the production of further quantities of mono-alkylbenzenes in a one step process. Thus, we may use the gaseous olefins, propylene or butylene, and operate as in the above examples to obtain isopropylbenzene or a mixture of isobutyl- and tert-butylbenzene, both the absorption of said olefins in the benzenes and the transformation of the polyalkylated products into mono-alkylated products being considerably improved by the constant maintenance of hydrogen chloride in the reaction mixture in concentrations of up to 0.3%.

In the examples given above, we employed an ordinary commercial stirrer, such as that usually employed for reactions of this type. The stirrer however, forms no part of the invention, which is concerned with the provision of a constant concentration of hydrogen chloride in the reacting liquor, and the provision of sufficient hydrogen chloride as a gaseous phase in contact therewith so as to maintain said reacting liquor concentration at the optimum value.

Ordinarily the process herein contemplated may be carried out at atmospheric pressure, however for certain purposes, the process may be also carried out under increased pressure, that is at pressures above that corresponding to normal atmospheric pressure.

The polyethylbenzenes herein contemplated are composed of the di-, tri-, tetra-, penta- and hexa-ethylbenzene, that is, the naturally formed ethylbenzenes which are more highly alkylated than the monoethylbenzene. The exact proportion of each of the higher ethylbenzenes in the mixture is unknown, however they are obtained from the alkylation mixture by removing the mono-ethylbenzene (and the benzol) therefrom.

What we claim is:

1. The process of producing mono-ethylbenzene, which comprises forming a solution consisting of polyethylbenzenes dissolved in benzene, saturating said solution with hydrogen chloride, and thereupon reacting said solution with ethylene in the presence of anhydrous aluminum chloride, to produce a mixture comprising mono-ethylbenzene, and higher ethylbenzenes together with unreacted benzene.

2. The process defined in claim 1, in which the solution of polyethylbenzene in benzene is saturated to the point where it contains from 0.60% to 1.6% by weight of hydrogen chloride.

3. The process defined in claim 1, in which the reaction of said solution with ethylene is carried out in the presence of from 0.15% to 0.30% by weight hydrogen chloride.

4. The process of producing mono-ethylbenzene, which comprises forming a solution consisting of polyethylbenzene dissolved in benzene, dissolving anhydrous hydrogen chloride gas therein until said solution contains up to 2.0% by weight of HCl, passing said solution into a Friedel-Crafts reaction zone wherein the solubility of HCl is reduced to less than 0.40% by weight and passing ethylene gas into said zone.

5. The process which comprises reacting in an alkylation zone in the presence of a Friedel-Crafts catalyst, benzene, an olefin and polyalkylbenzenes and supplying to said alkylation zone a liquid feed comprising benzene and hydrogen chloride dissolved in said benzene.

6. The process which comprises reacting in an alkylation zone, in the presence of an aluminum chloride catalyst, benzene, ethylene and polyethylbenzenes and supplying to said alkylation zone a liquid feed comprising benzene and polyethylbenzenes and hydrogen chloride dissolved in said benzene and polyethylbenzenes.

7. The process which comprises reacting in an alkylation zone, in the presence of an aluminum chloride catalyst, benzene, ethylene and polyethylbenzenes and supplying to said alkylation zone a liquid feed comprising a solution of benzene, distilled polyethylbenzenes and hydrogen chloride dissolved therein.

8. The process defined in claim 7 in which the distilled polyethylbenzenes have a boiling range of from 180° C. to 330° C. Engler.

EDWARD N. ROSENQUIST.
ROY W. SUDHOFF.